United States Patent [19]

Theis

[11] Patent Number: 5,192,887
[45] Date of Patent: Mar. 9, 1993

[54] STARTING MULTI-SPEED MOTORS AT A LOW SPEED CONNECTION

[75] Inventor: Kenneth R. Theis, Collinsville, Ill.

[73] Assignee: Emerson Electric Co., St. Louis, Mo.

[21] Appl. No.: 764,185

[22] Filed: Sep. 23, 1991

[51] Int. Cl.[5] .................. H02K 11/00; H02P 1/34; H02P 7/36; H02P 1/42
[52] U.S. Cl. .................. 310/68 C; 310/72; 318/778; 318/788; 318/792
[58] Field of Search .............. 310/68 C, 72; 318/66, 318/268, 270, 271, 727, 775, 776, 778, 783, 785, 788, 791, 792, 799, 805, 806, 808, 812; 388/803, 806, 807, 808

[56] References Cited

U.S. PATENT DOCUMENTS

| | | | |
|---|---|---|---|
| 3,633,082 | 1/1972 | Hasegawa | 318/220 R |
| 3,821,602 | 6/1974 | Linkous | 310/68 C |
| 3,879,685 | 4/1975 | Epstein et al. | 318/221 |
| 4,119,894 | 10/1978 | Sorensen | 318/221 |
| 4,131,832 | 12/1978 | Cavil et al. | 318/358 |
| 4,262,225 | 4/1981 | Hildebrandt et al. | 310/68 E |
| 4,408,244 | 10/1983 | Weible | 310/68 C |
| 4,772,814 | 9/1988 | Lewus | 310/72 |

Primary Examiner—Steven L. Stephan
Assistant Examiner—C. LaBalle
Attorney, Agent, or Firm—Polster, Lieder, Woodruff & Lucchesi

[57] ABSTRACT

A multi-speed electric motor (1) has a main electrical winding (3) and an auxiliary electrical winding (5) connected in parallel. One additional electrical winding (21) is connected in series with the parallel connected main and auxiliary windings, and another additional electrical winding (23) is connected in series with this third winding. A temperature sensitive resistive element (25) is connected in parallel with at least one of the additional electrical windings. The resistive element improves the motor's starting torque when one or more additional windings are initially connected in the motor circuit as it is started.

12 Claims, 1 Drawing Sheet

STARTING MULTI-SPEED MOTORS AT A LOW SPEED CONNECTION

BACKGROUND OF THE INVENTION

This invention relates to dynamoelectric machines such as electric motors and, more particularly, to an improvement for starting such motors when they are configured for low speed operation.

Certain household appliances, for example electric fans, are designed to operate at multiple speeds, with the operating speed at any one time selected by the user. An electric motor used to rotate the fan blade must be capable of running at, for example, a high speed, one or more medium speeds, and a low speed. (At a minimum, operation at a high speed and at a low speed is required for such appliances.) One problem with the multi-speed motors used in these appliances is they produce insufficient torque, when configured for low speed (rpm) operation, to start or "break away" the rotor. This problem is particularly serious when the motor uses sleeve bearings or bushings. One solution to the problem is to replace the sleeve bearings with ball bearings; however, ball bearings are more expensive than sleeve bearings and have increased noise transmission as compared to that of sleeve bearings. Since a fan, for example, is directly connected to the motor shaft, motor noise is more noticeable when ball bearings are used than with a motor employing sleeve bearings.

A second possible solution is to always start the appliance at one of the higher motor speeds and then switch the motor down to a lower operating speed. This approach, however, complicates the motor switching involved, is inconvenient to the user, and therefore is probably not acceptable to the user.

A third solution is to add certain electrical components to the motor circuit to increase the starting torque required of the motor at the lower operating speed switch settings. An example of this approach is shown in Italian Pat. No. 29291-A/77. In that patent, series connected resistors were connected in series to the parallel connected main and auxiliary motor windings. In addition, a positive temperature coefficient (PTC) device was connected in parallel across all three resistors. A multi-position electrical switch was set to increase or decrease the amount of resistance in the circuit to control motor speed. The PTC device shunted some of the current flow around the series connected resistors, during motor start-up, to improve starting torque. As the device then heated up, and its resistance increased, there was less current flow through the device. While this approach does improve low-speed starting torque, it unfortunately, is not the best solution because of continued power losses due to current flow through the resistors.

SUMMARY OF THE INVENTION

Among the several objects of the present invention may be noted the provision of an improvement to a multi-speed electric motor of the type used with household appliances such as electric fans; the provision of such a motor with improved starting torque when the motor is set for low-speed or intermediate-speed operation, without adversely effecting the motor's ability to start when set for high-speed operation; the provision of such a motor which incorporates a positive temperature coefficient (PTC) device connected across at least one motor winding used to establish low speed operation of the motor; and, the provision of such an improvement which is readily incorporated in the motor.

Other objects and features will be in part apparent and in part pointed out hereinafter.

In a first aspect of the present invention, an electric motor having at least a "HIGH" speed of operation and a "LOW" speed of operation has at least a main electrical winding and an additional electrical winding. The additional electrical winding is series connected with the main electrical winding. Circuitry is provided for applying power to the main winding for HIGH speed operation of the motor and for applying power across at least the main winding and the additional winding for LOW speed operation of the motor. A temperature sensitive element is connected in parallel across at least the additional electrical winding to improve the starting torque characteristics of the motor when it is started in other than its HIGH speed operating condition.

In a second aspect of the present invention, a permanent split capacitor motor has a main winding connected in parallel across a series connected capacitor and auxiliary winding. A plurality of series connected additional windings are included for providing the motor a plurality of operational speeds including a "HIGH" speed in which none of the additional windings are energized, at least one intermediate speed in which the main winding and at least one of the additional windings are energized, and a "LOW" speed in which the main winding and all the additional windings are energized. The additional windings are series connected with the main winding. Circuitry is provided for selecting the operating speed of the motor, and further circuitry is provided for improving the starting torque of the motor when the operating speed selected by the selecting means when the motor is started is other than HIGH speed.

In a third aspect of the present invention, a multi-speed motor for use in a household appliance has first and second windings connected in parallel and a capacitor series connected with one of the windings. A third winding is series connected with the first and second windings. A multi-position switch is provided for selecting the operating speed of the motor. The switch includes a HIGH speed setting which includes the first and second windings, a LOW speed setting further including the third winding, and at least one additional winding interconnected with the aforesaid windings for providing a MEDIUM speed setting of motor operation. The additional winding is series connected with the third winding with the switch means having a MEDIUM speed setting which includes the first and second windings and the additional winding. Circuitry is connected in parallel across the third winding and additional windings to improve the starting torque of the motor when it is started at MEDIUM or LOW speed.

BRIEF DESCRIPTION OF THE DRAWINGS

Corresponding reference characters indicate corresponding parts in the drawings.

DESCRIPTION OF THE PREFERRED EMBODIMENT

Figure 2:
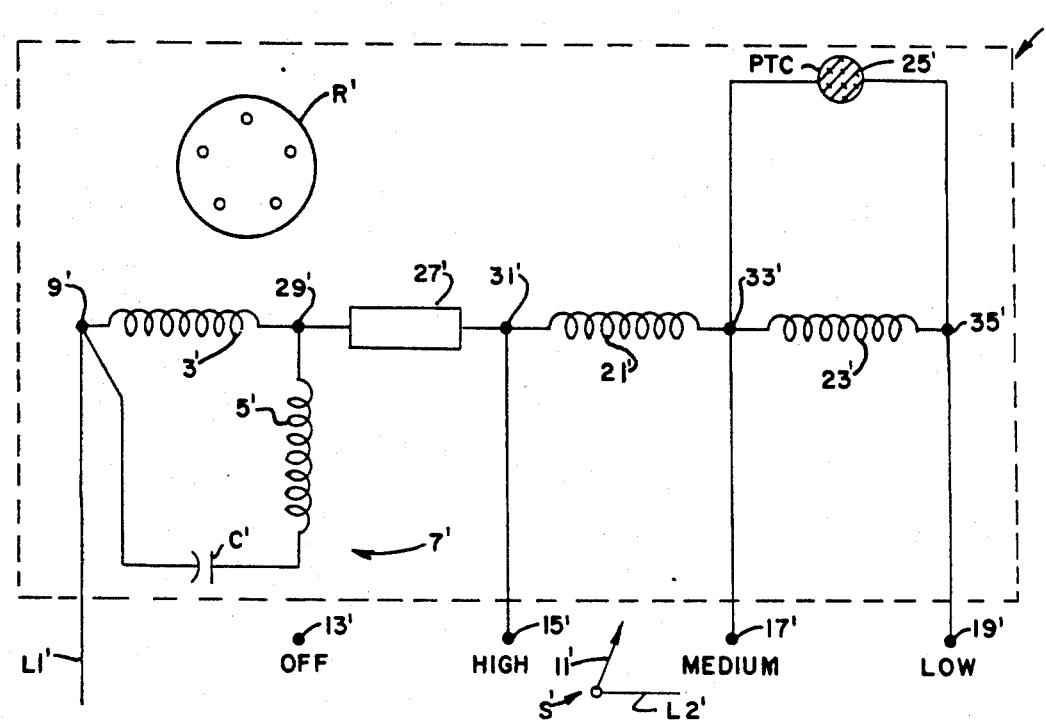

Referring to the drawings, a multi-speed permanent split capacitor (PSC) electric motor 1 of the present invention has a rotor R, a main electrical winding 3 and an auxiliary electrical winding 5. Windings 3 and 5 are connected in parallel. The auxiliary winding branch 7 of the motor circuit includes a capacitor C connected in series with the auxiliary winding.

Electrical current to the windings is supplied via lines L1 and L2. Line L1 is directly connected to a common point 9 between main winding 3 and circuit branch 7. Line L2 is connected to the motor circuit through a multi-position electrical switch S. Motor M is used, for example, in a household appliance such as an electric fan, and switch S allows the user to select the operating speed of the fan. Typically, the fan has three operating speeds; a high speed, a medium or intermediate speed, and a low speed. Although not shown, some fans may have more than one intermediate speed and the switch in those cases is configured to accommodate the additional settings required.

Figure 1:
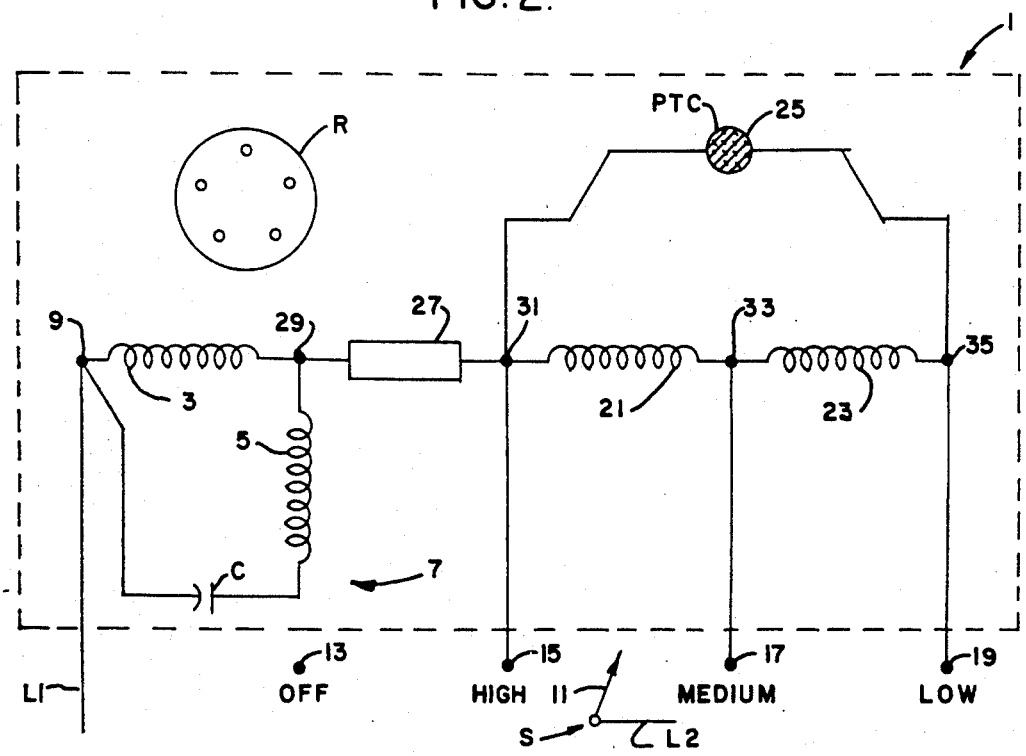
FIG. 1 is an electrical schematic illustrating the improvement of the present invention; and, FIG. 2 is an electrical schematic illustrating an alternate embodiment thereof.

As shown in FIG. 1, switch S has a switch arm 11 movable to a first electrical contact 13 which comprises an OFF position for the motor or fan. The switch arm is also movable to an electrical contact 15 which is a HIGH speed position for the fan, an electrical contact 17 which is a MEDIUM speed position, and a contact 19 which is a LOW speed position.

A third electrical winding 21 is connected in series with the parallel connected main and auxiliary windings. Further, a fourth electrical winding 23 is connected in series with winding 21. It will be understood that if the motor had more than one intermediate speed there would be additional windings connected in series between windings 21 and 23. It will be further understood that in the case of a two-speed motor, intermediate speed winding 21 may be omitted.

A temperature sensitive resistive element 25 is connected in parallel with windings 21 and 23. Preferably, the resistive element is a positive temperature coefficient (PTC) device. Such a device, which is, for example, commercially available from Keystone Carbon Company as their model no. RL5310-20-110-120-PTX-009A, has a low resistance value when current is first applied to it. As unit 25 heats up, due to continued application of current, its resistance increases and less current flows through it.

A circuit protector 27 is connected between a common point 29 of the main and auxiliary windings, and a common point 31 to which one side of winding 21 is also connected. Electrical contact 15 is also connected to this latter common point. Electrical contact 17 is connected to a common point 33 between the other side of winding 21 and winding 23. Lastly, electrical contact 19 is connected to a common point 35 on the other side of winding 23. During fan operation, a HIGH switch setting will have main winding 3 and branch 7 of the PSC arrangement in the circuit path between lines L1 and L2. A MEDIUM switch setting will include the main winding and branch 7 as well as winding 21; while a LOW switch setting will include the main winding, branch 7 and the series connected windings 21 and 23. As noted above, if additional windings are included in the motor (for additional intermediate speeds), they would also be included in the path between L1 and L2 for the appropriate switch setting.

By incorporating device 25 in parallel with medium and low speed windings 21 and 23, motor starting torque for starting the fan with switch S in the LOW speed position is improved significantly. Test results indicate that use of device 25, when connected in parallel with windings 21 and 23, as shown in FIG. 1, produces approximately a 133% increase in the starting torque when the motor starts initially in the low speed mode. Tests further indicate a starting torque increase of approximately 45% for the motor in the MEDIUM speed position.

Referring to FIG. 2, an alternate embodiment of the improvement of the present invention is shown. All common components are designated with a "'". As shown in FIG. 2, it may be advantageous to connect a PTC device 25' only across the LOW speed winding 23'. In this configuration, there is an improvement in starting torque when motor 1' is to be started with switch S' in its LOW speed setting.

The provision of the PTC device in accordance with the improvement shown in FIG. 1 or FIG. 2 causes a reduction in starting torque for the motor, when switch S or S' is respectively set to HIGH speed. However, at the HIGH speed setting, the starting torque is already sufficiently high so that this reduction does not adversely effect the motor's starting capability. In the embodiment of FIG. 2, provision of the PTC device also causes a reduction in starting torque when switch S' is set to MEDIUM speed. Depending upon motor strength at this MEDIUM speed setting, the starting torque is generally sufficiently high enough that the reduction will not effect motor starting. Similarly, care may need to be taken with the embodiment of FIG. 2 to insure that it is appropriately used in some applications. This is because starting a motor with switch S' in the MEDIUM speed position can cause a reduction in starting torque. Normally, however, the design of a motor is such that this is not a problem.

Numerous variations, within the scope of the appended claims, will be apparent to those skilled in the art in light of the foregoing description and accompanying drawings.

Having thus described the invention, what is claimed and desired to be secured by Letters Patent is:

1. An electric motor having at least a "HIGH" speed of operation and a "LOW" speed of operation, the motor having a main electrical winding, an additional electrical winding series connected with the main electrical winding, and a circuit branch comprising a series connected capacitor and auxiliary winding, the main winding being connected in parallel with the branch circuit means for applying power to the main winding for HIGH speed operation of the motor and for applying power across at least the main winding and the additional winding for LOW speed operation of the motor, and a temperature sensitive element connected in parallel across at least the additional electrical winding to improve the starting torque characteristics of the motor when it is started in other than its HIGH speed operating condition, the power applying means including switch means for selecting the motor operating speed.

2. The motor of claim 1 which is a permanent split capacitor (PSC) motor.

3. The motor as set forth in claim 1 wherein the motor also has at least one intermediate speed, said motor further including an additional electrical winding for each intermediate speed of operation, said intermediate speed additional winding being connected in series with both the main winding and the LOW speed additional winding.

4. The motor of claim 3 wherein the switch means includes a plurality of electrical contacts connected to the electrical windings so as to enable selectable control of the operating speed of the motor.

5. The motor of claim 1 wherein the temperature sensitive element is a positive temperature coefficient (PTC) device.

6. The motor of claim 5 in which the PTC device is connected only across the "LOW" speed winding.

7. The motor of claim 5 in which the PTC device is connected across the LOW speed winding and at least one intermediate speed winding.

8. In a permanent split capacitor motor having a main winding connected in parallel across a series connected capacitor and auxiliary winding, the improvement comprising a plurality of series connected additional windings for providing the motor a plurality of operations speeds including a "HIGH" speed in which none of the additional windings are energized, at least one intermediate speed in which the main winding and at least one of the additional windings are energized, and a "LOW" speed in which the main winding and all the additional windings are energized, said additional windings being series connected with the main winding, means for selecting the operating speed of the motor, and means for improving the starting torque of the motor when the operating speed selected by the selecting means when the motor is started at other than HIGH speed, said means for improving starting torque including a positive temperature coefficient (PTC) device connected in parallel across at least one of the additional windings, said additional winding being the winding for LOW speed operation whereby a starting torque improvement is obtained only for LOW speed motor start-up.

9. The improvement of claim 8 wherein the PTC device is connected across at least two additional windings.

10. A multi-speed motor for use in a household appliance and having first and second windings connected in parallel and a capacitor series connected with one of the windings, a third winding series connected with said first and second windings and multi-position switch means for selecting the operating speed of the motor, the switch means including a HIGH speed setting which includes the first and second windings, and a LOW speed setting further including the third winding, and at least one additional winding interconnected with the aforesaid windings for providing a MEDIUM speed setting of motor operation, said additional winding being series connected with the third winding with the switch means having a MEDIUM speed setting which includes the first and second windings and the additional winding, and means connected in parallel across the third winding and additional windings to improve the starting torque of the motor when it is started at MEDIUM or LOW speed, the means for improving starting torque including temperature responsive means which includes a positive temperature coefficient device.

11. The multi-speed motor of claim 10 having more than one MEDIUM speed of operation, the motor including another winding for each additional operating speed with each additional winding being series connected with the other additional windings and the temperature responsive means being connected in parallel across the third winding and all the additional windings.

12. The motor of claim 11 further including circuit protector means interposed between the first and second windings and the additional windings.

* * * * *